US007013167B2

(12) United States Patent
Pan

(10) Patent No.: US 7,013,167 B2
(45) Date of Patent: Mar. 14, 2006

(54) PORTABLE PHONE WITH CHANGEABLE HOUSING AND METHOD OF ASSEMBLING THE SAME

(75) Inventor: Long-Jyn Pan, Shijr (TW)

(73) Assignee: BenQ Corporation, Taoyuan (TW)

( * ) Notice: Subject to any disclaimer, the term of this patent is extended or adjusted under 35 U.S.C. 154(b) by 527 days.

(21) Appl. No.: 10/287,533

(22) Filed: Nov. 5, 2002

(65) Prior Publication Data

US 2003/0087611 A1    May 8, 2003

(30) Foreign Application Priority Data

Nov. 6, 2001   (TW) ............................... 90127592 A

(51) Int. Cl.
*H04B 1/38*    (2006.01)

(52) U.S. Cl. ............... 455/575.1; 455/90.3; 455/575.8; 455/550.1; 379/433.01

(58) Field of Classification Search ............ 455/575.1, 455/550.1, 90.1, 90.2, 90.3; 379/433.01, 379/433.02

See application file for complete search history.

(56) References Cited

U.S. PATENT DOCUMENTS 6,463,263 B1 * 10/2002 Feilner et al. ............. 455/90.1

* cited by examiner

*Primary Examiner*—Nick Corsaro
*Assistant Examiner*—Eugene Yun
(74) *Attorney, Agent, or Firm*—Rabin & Berdo, PC

(57) ABSTRACT

The disclosed portable phone with changeable housing uses a battery pack as a control mechanism for changing the housing and includes a front housing, a rear housing, a printed circuit board and a battery pack. A battery place area is formed at the back surface of the rear housing, and a plurality of protruding ribs are formed at the periphery of the battery pack. During assembly of the portable phone, the printed circuit board is electrically attached to the front surface of the rear housing, and the primary hooks at the flange of the back surface of the front housing are inserted through the associated primary openings at the rim of the front surface of the front housing, so as to form a plurality of battery caves at the sidewalls of the battery place area. Then, the battery pack is situated in the battery place area, and the protruding ribs are engaged with the associated battery caves. When the user desires to change the front housing, the user first removes the battery pack from the battery place area, to separate the front housing and rear housing.

19 Claims, 6 Drawing Sheets

PORTABLE PHONE WITH CHANGEABLE HOUSING AND METHOD OF ASSEMBLING THE SAME

This application incorporates by reference of Taiwan application Serial No. 90127592, filed Nov. 6, 2001.

BACKGROUND OF THE INVENTION

1. Field of the Invention

The invention relates in general to a portable phone with a changeable housing, and more particularly to a method of assembling the portable phone with a changeable housing by using a battery pack as the control mechanism.

2. Description of the Related Art

The portable phone has become a widely accepted and necessary tool of wireless communication for the modern people. Most portable phones are light and small enough to be portable, while providing various functions, but the consumers demand more of from the portable phone. For example, the distinguishing appearance of the cellular phone has become one of the important factors of purchase for the customers. Customers desire a distinguishing appearance (such as contour, texture or color) to meet their personal taste and preference. Therefore, many manufacturers provide a variety of stylish and colored looks of the portable phones. Additionally, the housings mounted on the phones could be changed. In the commercial market, changeable housings with different colors are provided for some models of cellular phones. Some housing made by particular textures or coated by special paints present the dramatic effect, i.e. a change of color with a different light or viewing angle. In the age of personalization, the market demand of portable phones with changeable housings is increasing.

There are many ways to change the phone housings. Some models of portable phones have partially changeable interface; for example, the front housing, or faceplate, mounted on the front housing is changeable. Some other portable phone models have changeable front and rear housings. However, the conventional methods of changing the housings require an external force to disassemble the housings. This would be harmful to the underlying printed circuit board pathways or/and operation system. Furthermore, after changing the appearance several times, the inappropriate action of external force could deform the hardware structure such as the mounting pegs, extending ribs, peripheral flange of the housing and the like. Consequently, the portable phone with deformed hardware cannot be firmly assembled. Therefore, after a number of housing changes, conventionally produced portable phones do not permit the user to alter the appearance of the phones optionally. For some models, the manufacturers suggest that the user should bring the portable phone back to the distributors and the appearance change is then performed by a technician. It is very inconvenient for the user to do the change casually.

U.S. Pat. No. 5,768,370 to Maatta et al (Nokia Mobile Phones, Ltd.) discloses a display system for providing a portable phone with a variety of distinctive appearances. The user has the ability to "mix and match" the cover-components and to obtain whatever color combination is pleasing to him or her at the moment. However a working tool, such as screwdriver or coin, is still needed to pry the cover-components off the portable phone, and thus easily causes the scrapes on the cover-components. The blemished cover mars the appearance of the portable phones.

Additionally, some commercially available models of portable phones further have a removing mechanism, which is generally equipped on the exterior surface of the portable phones, to unlock the front and rear housings. However, the design of the exposed removing mechanism is an issue of the appearance defect.

SUMMARY OF THE INVENTION

It is therefore an object of the invention to provide a portable phone with changeable housing and a method of assembling the same. By using a battery pack as the control mechanism for changing the housing, it is time saving for the user to do the assembly or disassembly. Also, the entire structure of assembled portable phone is very firm. Additionally, the disassembly procedure does no harm to the circuit system and operating devices of the portable phone.

According to the objective of the invention, a portable phone with changeable housing is provided, comprising a front housing, a rear housing, a printed circuit board and a battery pack. A plurality of first fitting hooks and primary hooks are formed at the flange of the back surface of the front housing. A plurality of second fitting hooks and primary openings are formed at the rim of the front surface of the front housing. The positions of the first fitting hooks are associated with the second fitting hooks, while the positions of the primary hooks are associated with the primary openings. Also, a battery place area is formed at the back surface of the rear housing, and a plurality of protruding ribs are formed at the periphery of the battery pack. During assembly of the portable phone, the printed circuit board is electrically attached to the front surface of the rear housing, and the primary hooks are inserted through the associated primary openings so as to form a plurality of battery caves at the sidewalls of the battery place area. Then, the battery pack is situated in the battery place area, and the protruding ribs are engaged with the associated battery caves. When the user desires to change the front housing, the first step is to separate the front housing and rear housing by removing the battery pack from the battery place area.

Other objects, features, and advantages of the invention will become apparent from the following detailed description of the preferred but non-limiting embodiments. The following description is made with reference to the accompanying drawings.

DETAILED DESCRIPTION OF THE INVENTION

According to the portable phone with changeable housing of the present invention, several primary hooks at the flange of the front housing are inserted through the associated primary openings at the rim of the rear housing, and thus form several battery caves on the sidewall of battery place area of the rear housing. The protruding ribs at the periphery of battery pack are then lockingly engaged to the associated battery caves. When the user wants to change the front housing, the first step is to remove the protruding ribs from the battery caves, so that the primary hooks can be released from the primary openings.

In the following description, a preferred embodiment is taken for illustrating the invention, but the invention is not limited hereto. In the practical application, some supplementary components may be further adopted for the improvement of aesthetic appeal or operation utility. Accordingly, to avoid obscuring the invention, well-known or unnecessary elements not directly relevant to the invention are not shown nor described. Also, some necessary components cannot be shown in figures due to the viewing angle of drawing; however, these invisible components have the identical appearances and are located at symmetric positions as the components with the same names. Thus, there is no effect on the clarity of the specification therein.

Figure 1:
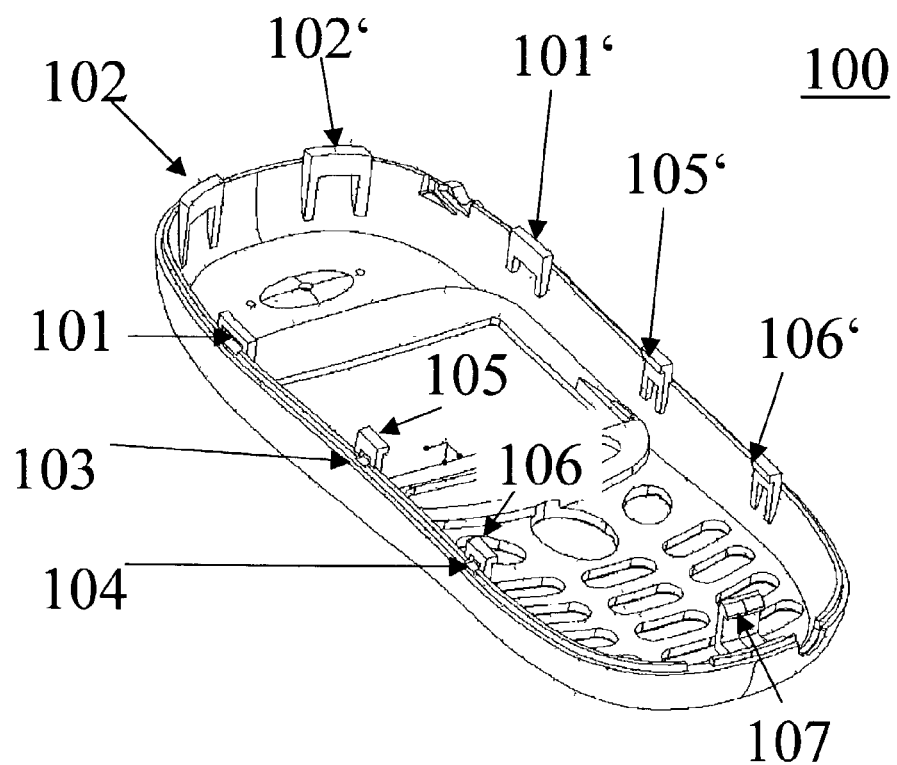
FIG. 1 is a perspective view of the back surface of a front housing according to the preferred embodiment of the invention.

FIG. 1 is a perspective view of the back surface of a front housing according to the preferred embodiment of the invention. There are several hooks arranged on the peripheral flange of the back surface of the front housing 100. Those hooks can be divided into two groups according to their functions. One group is labeled as the first fitting portion, including the fitting hooks 101, 101', 102 and 102', and are symmetrically arranged on the upper side of the peripheral flange. The other group is labeled as the first assembling portion, including the primary hooks 105, 105', 106 and 106', and are symmetrically arranged on the peripheral flange. Additionally, there is a secondary hook 107 formed on the lower end of the peripheral flange of the front housing 100.

Figure 2:
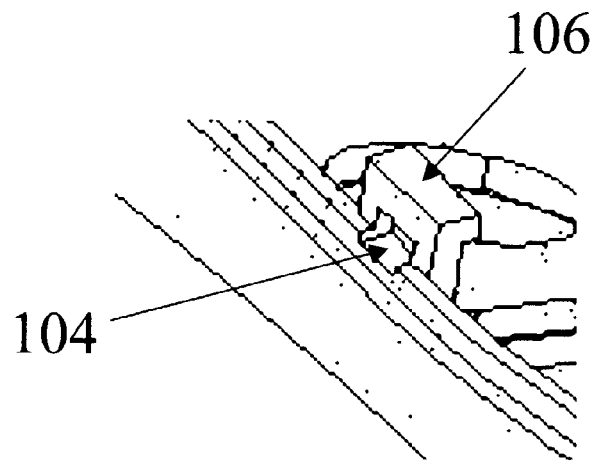
FIG. 2 is an enlarged view of the primary hook of FIG. 1.

Furthermore, there are several recesses located at the rim of the front housing 100. In order to provide a good decoration line of assembled portable phone, the recesses are located more inwardly at the rim. In this preferred embodiment, the recesses 103 and 104 are located right beneath the primary hooks 105 and 106, respectively. Two recesses are also located right beneath the primary hooks 105' and 106'; however, they are not shown in FIG. 1 due to the viewing angle of the drawing. FIG. 2 is an enlarged view of the primary hook of FIG. 1. It clearly depicts the outline and position of the recess 104, while the primary hook 106 is enlarged.

Figure 3:
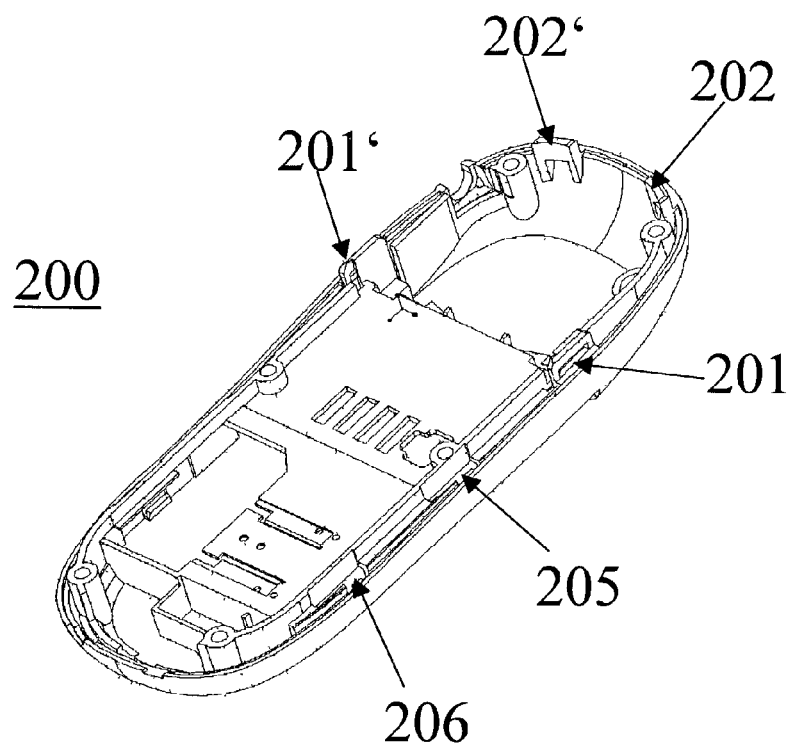
FIG. 3 is a perspective view of the front surface of a rear housing according to the preferred embodiment of the invention.

FIG. 3 is a perspective view of the front surface of a rear housing according to the preferred embodiment of the invention. A printed circuit board (not shown) is mounted to the front surface of a rear housing 200. During the assembly of the portable phone, the back surface of the front housing 100 is facing and engaging with the front surface of the rear housing 200. On the front surface of the rear housing 200, there are a second fitting portion and a second assembling portion at the peripheral flange. The second fitting portion includes the fitting hooks 201, 201', 202 and 202', which are symmetrically arranged on the upper side of the peripheral flange and associated with the fitting hooks 101, 101', 102 and 102'. The second assembling portion includes four primary openings 205, 206, and two other openings formed at the opposite positions (not shown in FIG. 3 due to the angle of the drawing), which are symmetrically located at the lower rim and associated with the respective primary hooks 105, 106, and the two hooks formed at the opposite positions, but not shown. Also, the rear housing 200 is run through by the primary openings 205 and 206.

Figure 4:
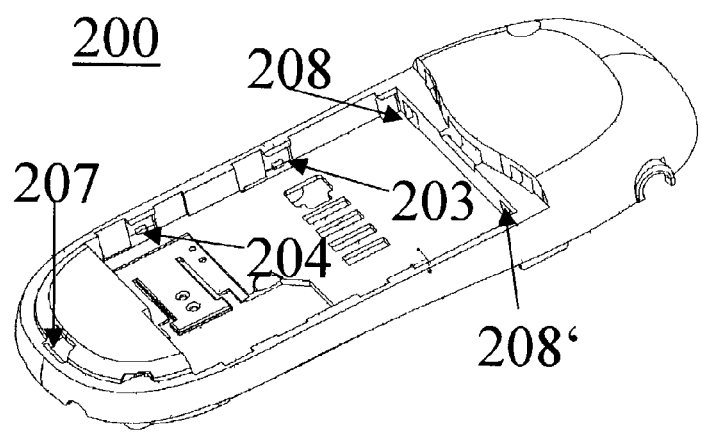
FIG. 4 is a perspective view of the back surface of the rear housing of FIG. 3.

FIG. 4 is a perspective view of the back surface of the rear housing of FIG. 3. In FIG. 4, the aperture, generally rectangular, is a battery place area created for placing a battery pack. Four ledges 203, 204, and two others at the opposite positions (not shown due to the angle of the drawing) are formed at the sidewalls of battery place area. The positions and outlines of the ledges 203 and 204 are associated with the recesses 103 and 104. Also, a secondary opening 207 is formed at the lowest end of the rim of the rear housing 200. The secondary opening 207 opens through the rear housing 200 and the position thereof is associated with the secondary hook 107. Additionally, the mounting holes 208 and 208' are formed at the sidewall of the battery place area for jointing the battery pack.

Figure 5:
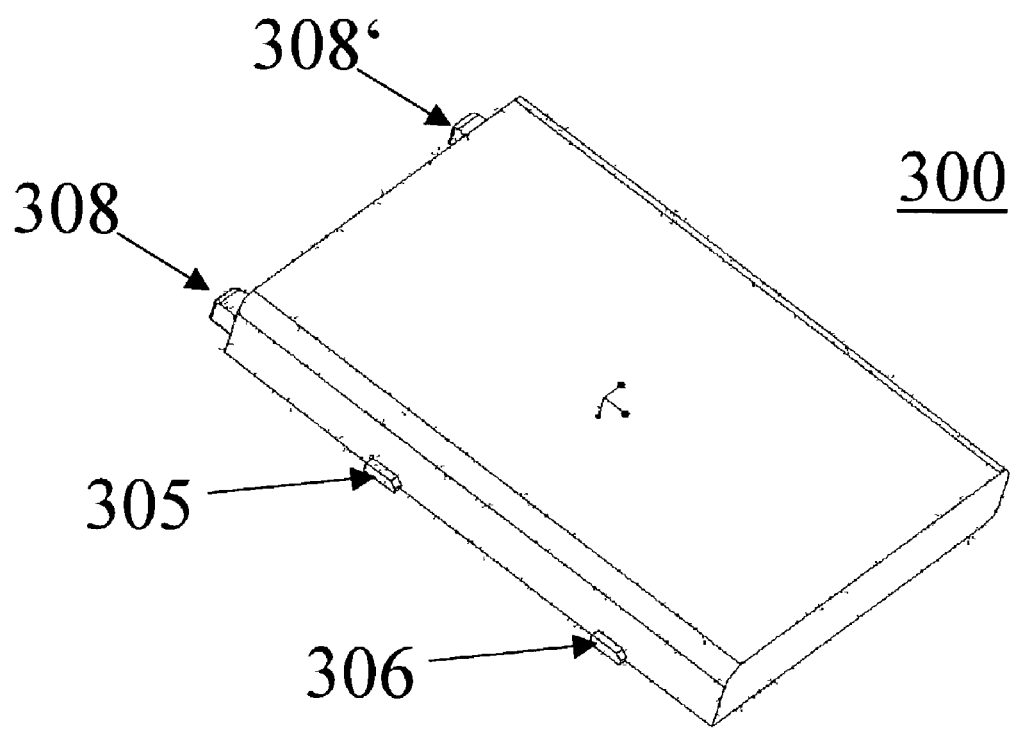
FIG. 5 is a perspective view of a battery pack according to the preferred embodiment of the invention.

FIG. 5 is a perspective view of a battery pack according to the preferred embodiment of the invention. Two mounting pins 308 and 308' project at the front surface of the battery pack 300, wherein the positions and shapes are associated with the mounting holes 208 and 208'. The important feature here is that four protruding ribs 305, 306, and two others formed at the opposite positions (not shown due to the angle of the drawing) are positioned at the periphery of the battery pack 300, to accomplish the engagement of the front housing 100 and the rear housing 200. The details of assembly are described below.

Figure 6A:
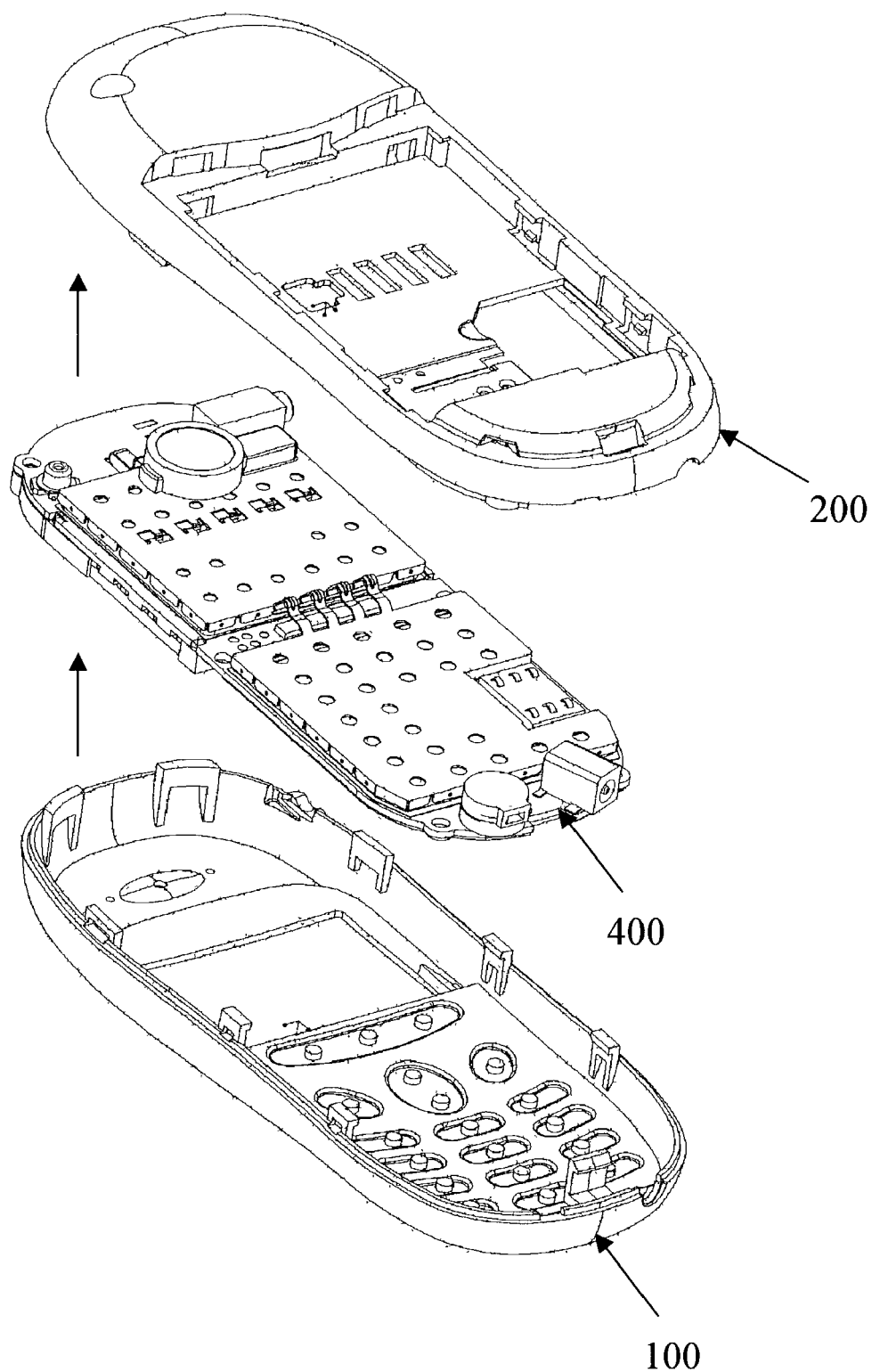
FIG. 6A~FIG. 6C illustrate a method of assembling the portable phone with changeable housing according to the preferred embodiment of the invention.
Figure 6B:
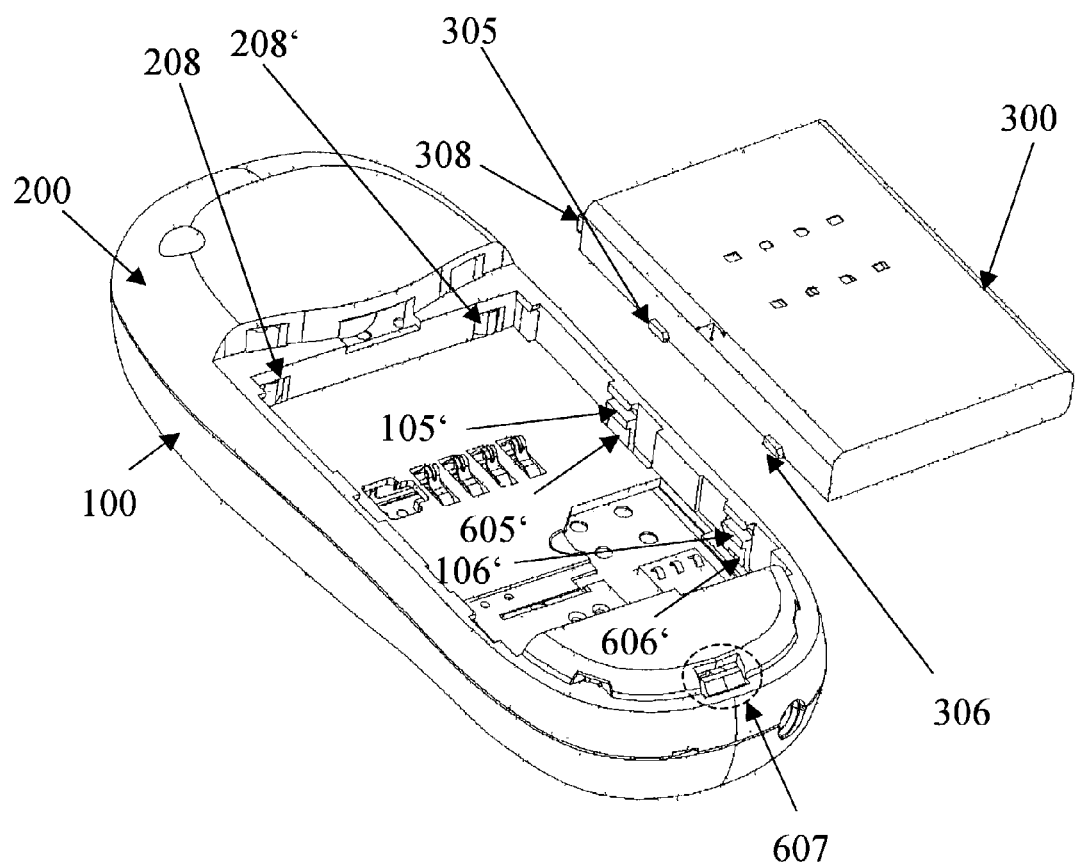
Figure 6C:
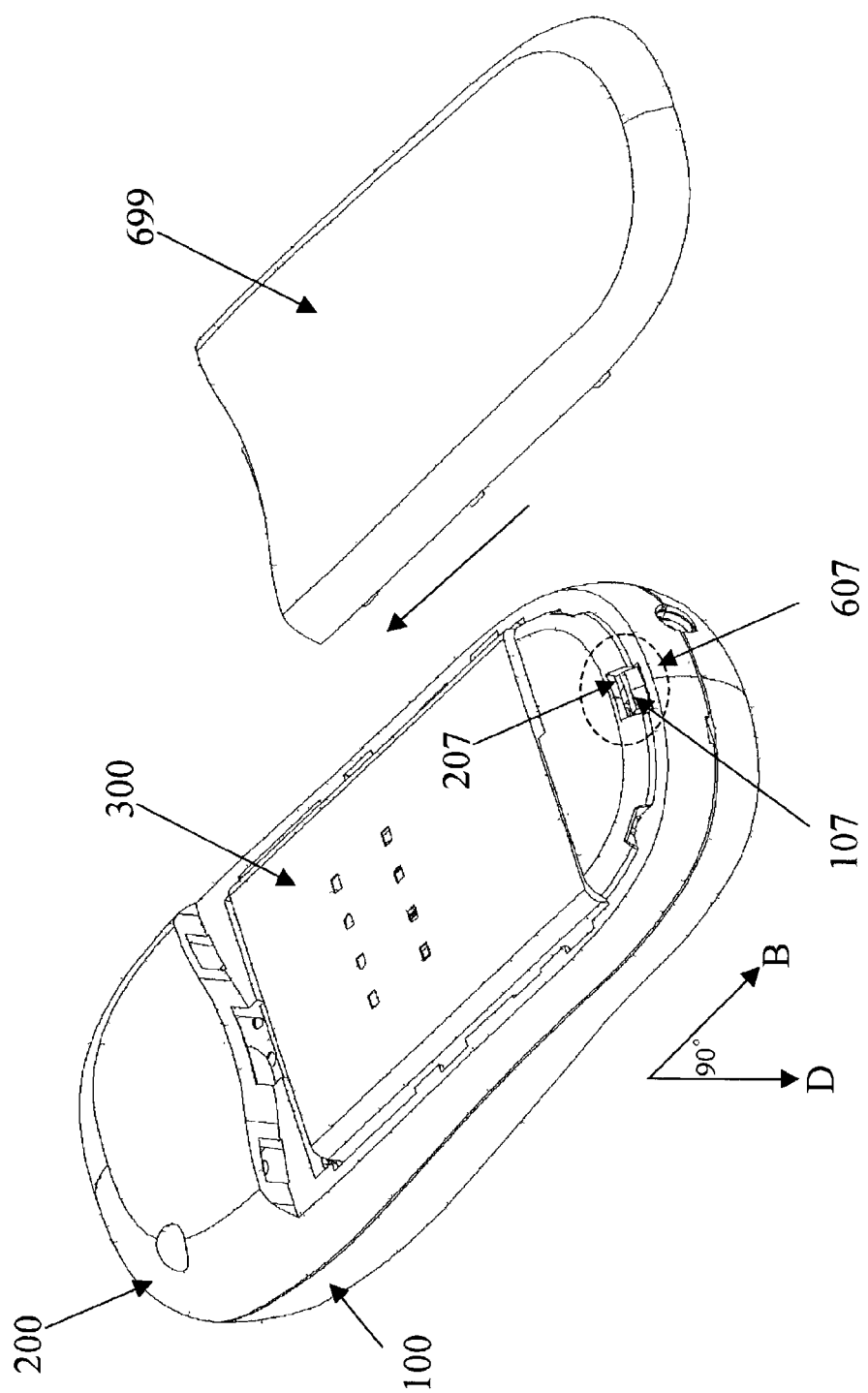

Referring to FIG. 6A~FIG. 6C, they illustrate a method of assembling the portable phone with changeable housing according to the preferred embodiment of the invention. As shown in FIG. 6A, the front housing 100, the rear housing 200, and the printed circuit board 400 are assembled. The printed circuit board 400 is electrically coupled to the rear housing 200, and firmly mounted at the front surface of the rear housing 200 by a fastening means, such as bolts or screws (not shown). Then, the back surface of the front housing 100 faces and engages with the front surface of the rear housing 200. The steps of assembling the housings 100 and 200 are described as follows. First, the fitting hooks 101, 101', 102 and 102' of the front housing 100 snap with the fitting hooks 201, 201', 202 and 202' of the rear housing 200, respectively. Next, the primary hooks 105, 105', 106 and 106' are inserted through the associated primary openings 205, 206, etc. Also, the recesses 103, 104, etc. (FIG. 1) underlying the primary hooks of the front housing 100 are engaged with the ledges 203, 204, etc. (FIG. 4) at the sidewalls of the battery place area. This provides a snap force between the front housing 100 and the rear housing 200 so that the housings do not easily separate while being engaged. In the meanwhile, the secondary hook 107 at the lowermost end of the front housing 100 projects from the secondary opening 207 of the rear housing 200, to form a removing mechanism 607 (see FIG. 6B) for removing the battery pack 300, and thus separating the front housing 100 and the rear housing 200.

After the front housing 100, the rear housing 200, and the printed circuit board 400 of FIG. 6A are well assembled, the structural details are shown in FIG. 6B. On the sidewalls of the battery place area, there are primary hooks 105, 105', 106, and 106' projected from the front housing 100. The space created by the L-shaped primary hook is so named as the battery cave. In this embodiment, four battery caves 605', 606', and two others at the opposite positions (not shown due to the angle of the drawing) are formed. The mounting pins 308 and 308' are inserted into the mounting holes 208 and 208', and then the protruding ribs (such as 305 and 306) are lockingly engaged with the associated battery caves. After the battery pack 300 is well positioned at the battery place area, the cover 699 is added on for shielding the battery pack 300, as shown in FIG. 6C.

When the user desires to change the front housing 100, the cover 699 has to be removed first. Then, the battery pack 300 is removed from the battery place area by moving the battery pack 300 along the opposite direction of arrow B. Then, the engaged recesses (at the front housing 100) and ledges (at the rear housing 200) could be separated by pressing the secondary hook 207 downward along the direction of arrow D. Accordingly, the front housing 100 can be easily removed and replaced.

According to the description of the embodiment disclosed above, the assembled portable phone of the invention provides the uniform and smooth decoration line, and the mechanical elements for jointing the front housing 100 and the rear housing 200, such as the first and second fitting portions, and the first and second assembling portions, are not exposed to view, as shown in FIG. 6C. Also, the protruding ribs at the battery pack 300 clasping the primary hooks at the front housing 100 enhance the structural firmness of the assembled portable phone. Furthermore, since the printed circuit board 400 is only electrically mounted on the rear housing 200 and has no mechanical connection with the front housing 100, the front housing 100 can easily be changed by removing the battery pack 300. This simple method of assembling and disassembling the front housing 100 causes no damage to the circuit system and operating components of the portable phone, and thus prevents the housings of portable phone from deformation after frequent change.

However, the invention is not limited herein. In the practical application, the number of some components could be slightly changed. For example, the number of recesses should be optionally selected such that the front housing 100 and the rear housing 200 can engage stably. Similarly, if the battery pack 300 can well clasp them and keep the front housing 100 from separating, the number of primary hooks can be optionally varied, such as only one primary hook or several primary hooks aligned in an array at each side of the front housing 100. The number and position of the other components associated with the primary hooks, such as the primary openings, battery caves, and protruding ribs, should correspond to those of the primary hooks. Additionally, the present invention can be applied to the other types of wireless communication systems, such as personal communication systems (PCS). Also, we can not only change the color of the front housing but also change the keypad and keypad holes in the front housing. Since the shape and position of keypad are changed, we can also change the design of the front housing according to different type of new keypads.

According to the aforementioned descriptions, the portable phone with changeable front housing of the invention has several advantages, including: (1) the housings being firmly assembled, and not easily separated due to a careless touch; (2) easy and time-saving assembly and disassembly of the housings, so that the user can perform the change; and (3) no harm caused to the inner circuit system and operating devices due to frequent is changes of the housings.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An assembly mechanism, for assembling a portable phone that has a front housing, a rear housing and a battery pack, and a battery place area is formed at the back surface of the rear housing for situating the battery pack, the assembly mechanism comprising:
    a plurality of first fitting hooks, positioned at a flange of the back surface of the front housing;
    a plurality of primary hooks, positioned at the flange of the back surface of the front housing;
    a plurality of second fitting hooks, positioned at a rim of the front surface of the rear housing and corresponded to the first fitting hooks;
    a plurality of primary openings, positioned at the rim of the front surface of the rear housing and corresponded to the primary hooks; and
    a plurality of protruding ribs, positioned at the periphery of the battery pack and corresponded to the primary hooks,
    wherein the back surface of the front housing faces the front surface of the rear housing during assembly, the first fitting hooks snap with the corresponding second fitting hooks, the primary hooks are inserted through the corresponding primary openings to form a plurality of battery caves, then the protruding ribs are engaged with the battery caves to fix the front housing.

2. The assembly mechanism according to claim 1, further comprising a removing mechanism for removing the battery pack and separating the front housing and the rear housing, wherein the removing mechanism includes a secondary hook positioned at the flange of the back surface of the front housing and a secondary opening positioned at the rear housing, the secondary hook is correspondingly inserted through the secondary opening.

3. The assembly mechanism according to claim 1, wherein at least one mounting pin is formed at the periphery of the battery pack, and the mounting pin is correspondingly inserted in an mounting hole formed at the sidewall of the battery place area.

4. The assembly mechanism according to claim 1, wherein a plurality of recesses are formed at the flange of the back surface of the front housing, and a plurality of ledges are formed at the rim of a front surface of the rear housing for engaging with the recesses correspondingly.

5. The assembly mechanism according to claim 1, wherein the portable phone further comprises a battery cover.

6. The assembly mechanism according to claim 1, wherein the portable phone further comprises a printed circuit board electrically coupled to the battery pack.

7. A portable phone with changeable housing, comprising:
    a front housing, having a front surface, a back surface, and a plurality of primary hooks formed at a flange of the back surface of the front housing;
    a rear housing, having a front surface, a back surface, a battery place area formed at the back surface of the rear housing, and a plurality of primary openings formed at the rim of the front surface of the rear housing and corresponded to the primary hooks, wherein the primary hooks are inserted in the corresponding primary openings and form a plurality of battery caves; and
    a battery pack, disposed at the battery place area, and a plurality of protruding ribs formed at a periphery of the battery pack, wherein the protruding ribs are correspondingly engaged with the battery caves.

8. The portable phone according to claim 7, wherein a plurality of first fitting hooks and a plurality of second fitting hooks are respectively formed at the flange of the back surface of the front housing and at the rim of the front surface of the rear housing, wherein the first fitting hooks are correspondingly engaged with the second fitting hooks.

9. The portable phone according to claim 7, wherein the battery caves are positioned at two sidewalls of the battery place area.

10. The portable phone according to claim 9, wherein four battery caves are evenly distributed at two sidewalls of the battery place area.

11. The portable phone according to claim 7, further comprising a removing mechanism for removing the battery pack and separating the front housing and the rear housing, wherein the removing mechanism includes a secondary hook positioned at the flange of the back surface of the front housing and a secondary opening positioned at the rear housing, and the secondary hook is correspondingly inserted through the secondary opening.

12. The portable phone according to claim 7, wherein at least one mounting pin is formed at the periphery of the battery pack, and the mounting pin is correspondingly inserted in an mounting hole formed at the sidewall of the battery place area.

13. The portable phone according to claim 7, wherein a plurality of recesses are formed at the flange of the back surface of the front housing, and a plurality of ledges are formed at the rim of the front surface of the rear housing for engaging with the corresponding recesses.

14. The portable phone according to claim 13, wherein the recesses are positioned beneath the primary hooks and the ledges are positioned at the primary openings.

15. The portable phone according to claim 7, wherein the portable phone further comprises a battery cover.

16. The portable phone according to claim 7, wherein the portable phone further comprises a printed circuit board electrically coupled to the battery pack.

17. The portable phone according to claim 7, wherein the portable phone is a cellular phone.

18. A method of assembling a portable phone, wherein the portable phone comprises a front housing, a rear housing, and a battery pack; a plurality of first fitting hooks and primary hooks are formed at a flange of the back surface of the front housing; a plurality of second fitting hooks and primary openings are formed at a rim of the front surface of the rear housing; a battery place area is formed at the back surface of the rear housing and a plurality of protruding ribs are formed at periphery of the battery pack, the method comprising the steps of:

snapping the first fitting hooks at the second fitting hooks;

inserting the primary hooks through the corresponding primary openings to form a plurality of battery caves at the sidewalls of the battery place area; and placing the battery pack in the battery place area, and engaging the protruding ribs with the corresponding battery caves.

19. The method of assembling a portable phone according to claim 18 further comprising a step of: shielding the battery place area with a battery cover after placing the battery pack in the battery place area.

* * * * *